United States Patent

[11] 3,624,404

| [72] | Inventor | Claude M. Hines<br>Pittsburgh, Pa. |
|---|---|---|
| [21] | Appl. No. | 11,811 |
| [22] | Filed | Feb. 16, 1970 |
| [45] | Patented | Nov. 30, 1971 |
| [73] | Assignee | Westinghouse Air Brake Company<br>Wilmerding, Pa. |

[54] ELECTROPNEUMATIC RELAY VALVE DEVICE USING RADIATION-SENSITIVE MEANS
5 Claims, 2 Drawing Figs.

[52] U.S. Cl. .................................................. 250/231,
250/227, 73/4
[51] Int. Cl. .................................................. G01d 5/34
[50] Field of Search .......................................... 250/231 P,
227, 215; 200/83 R; 92/48, 49; 73/239

[56] References Cited
UNITED STATES PATENTS

| 3,159,750 | 12/1964 | Kazan | 250/231 R |
| 3,208,264 | 9/1965 | Melton | 73/4 R |
| 3,390,274 | 6/1968 | Hunt | 250/231 R |
| 3,344,667 | 10/1967 | Maltby | 73/239 |
| 3,564,264 | 2/1971 | Karuhn | 250/231 X |

*Primary Examiner*—Walter Stolwein
*Attorney*—Ralph W. McIntire, Jr.

ABSTRACT: A manually or pneumatically controlled self-lapping-type valve means whereby a light from a source is transmitted by fiber-optic tube to a movable light-guide-carrying member to be accordingly positioned with respect to a plurality of photoresponsive sensors, to selectively effect energization of a plurality of control circuits. Selective energization of the control circuits effects selective energization of operational magnet valve means to serve specific control functions in a manner as that of a master controller device effecting energization of application and release magnet valves.

PATENTED NOV 30 1971 3,624,404
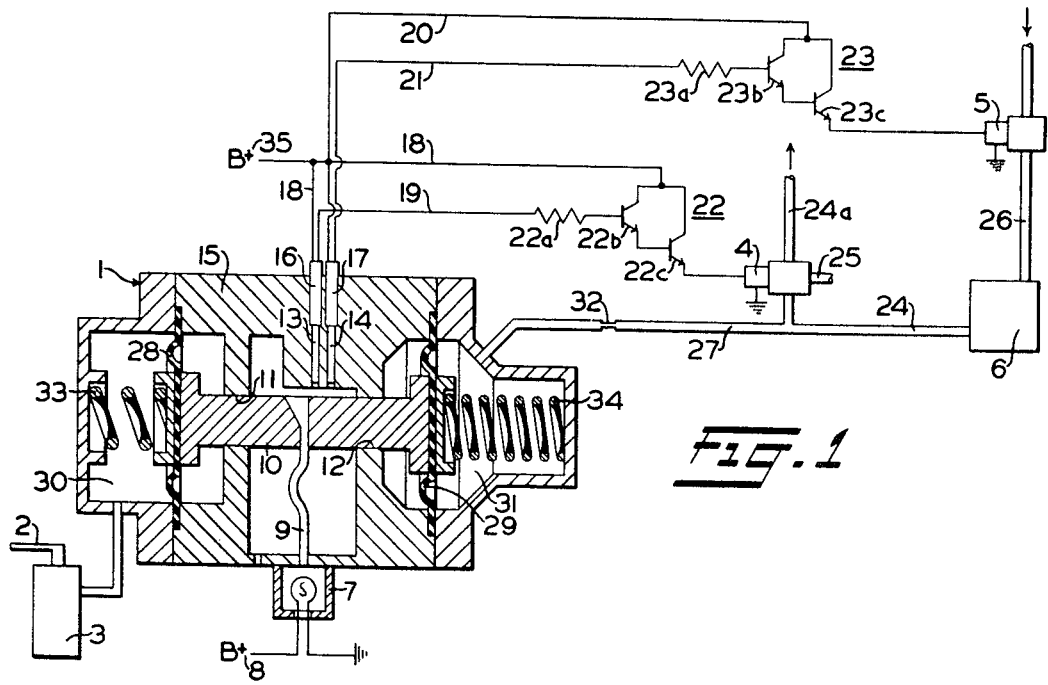
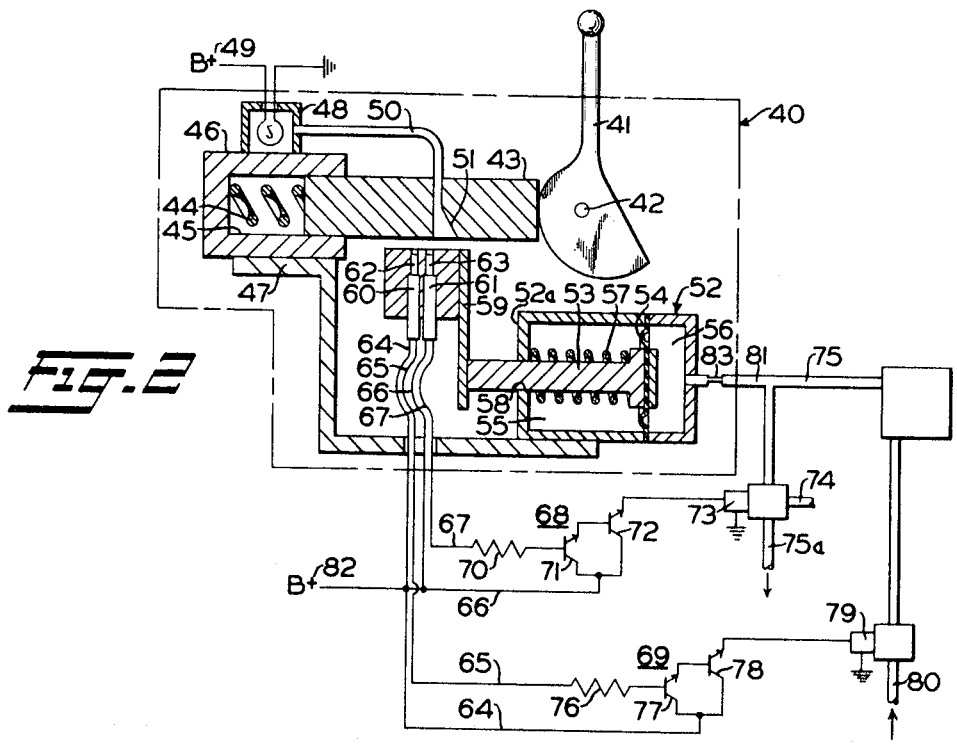
INVENTOR.
CLAUDE M. HINES
BY Ralph W. McIntire, Jr.
ATTORNEY

ELECTROPNEUMATIC RELAY VALVE DEVICE USING RADIATION-SENSITIVE MEANS

BACKGROUND OF INVENTION

In recent years there has been developed a low-cost lightweight fiber-optic light tube made of flexible plastic and of varying lengths. In view of the simplicity, light weight and low cost of fiber-optics tubes it would be advantageous to use such tubes with photoresponsive sensors in a manually or pneumatically operated self-lapping-type valve instead of utilizing close-fitting pneumatic passages in slide valve devices or electrical wires and movable contacts.

SUMMARY OF INVENTION

According to the present invention, there is provided a self-lapping-type electro-pneumatic relay valve of low cost and light weight for controlling energization of release and application magnet valves to regulate a pneumatic operation such as train brake control. This relay valve of the master controller type utilizes a fiber-optic tube supplied with light from a separate source to a light guide positionable either manually or pneumatically to beam selectively on a plurality of light-sensitive photodiodes to selectively effect energization of associated circuitry including release and application magnet valves to control a pneumatic braking control in accordance with the selective energization of the photodiodes by the light beam conducted by the fiber-optic tube.

In the accompanying drawing,

FIG. 1 is a sectional view of the pneumatically operated self-lapping relay valve with the fiber-optic tubing and photodiodes to control associated circuitry including release and application valves to effect a pneumatic control of train brakes.

FIG. 2 is sectional view of manually operated self-lapping relay valve utilizing another embodiment of the fiber-optic tubes and photodiodes for effecting a similar pneumatic control of train brakes.

DESCRIPTION FIG. 1

Referring to FIG. 1 of the drawing, there is shown pneumatic control apparatus including a pneumatic master controller or self-lapping valve 1, controlled pneumatically by positioning of a handle 2 on a control valve 3 to control selected circuits including release magnet valve 4 and application magnet valve 5 which in turn control delivery and venting of fluid under pressure to a pneumatic logic means 6. The pneumatic logic means 6 functions to control a pneumatic operation such as the braking in a train in a well-known manner. The apparatus includes a light source 7 energized by a battery source 8 for supplying a light beam within the flexible fiber-optic tube 9 to a movable light guide 10 slidably positioned in a pair of guide bores 11 and 12 within the body of the self-lapping valve 1. Stationarily mounted in ports 13 and 14 in the body 15 of the self-lapping valve 1 is a pair of photodiodes 16 and 17 positioned in a manner to selectively receive the light beam either singly to photodiode 16 or both 16 and 17 from a semiflared opening in the light guide 10 housing the fiber-optic tube 9, in accordance with movement of the light guide 10 as explained hereinafter.

The circuitry associated with the photodiodes 16 and 17 is similar for each one including wires 18, 19, 20 and 21 leading to identical transistor configurations or drivers 22 and 23. The transistor driver 22 includes a resistor 22a and two transistors 22b and 22c which when energized and "turned on" effect energization and operation of the release magnet valve 4 to close off the venting of the delivery pipes 24 and 24a at the exhaust port 25. The transistor driver 23 includes a resistor 23a and two transistors 23b and 23c which when energized and "turned on" effect energization and operation of the application magnet valve 5 to permit flow of fluid under pressure from a source (not shown) by a supply pipe 26 to the pneumatic logic means to effect supply of fluid under pressure to delivery pipes 24 and 24a and feedback pipe 27.

The self-lapping valve 1 further includes a pair of diaphragms 28 and 29 secured to opposite ends of the light guide 10 and the valve body 15 in a manner to form with the valve body 15 a supply chamber 30 on one end thereof to receive fluid under pressure under the control of the control valve 3 and a lapping chamber 31 on the opposite end thereof to receive fluid under pressure from the feedback pipe 27 via a choke 32. A pair of springs 33 and 34 within said chambers 30 and 31 abutting the respective diagrams 28 and 29 tend to maintain the light guide in a neutral position as shown wherein the light beam from the fiber-optic tube 9 does not contact either of the photodiodes 16 or 17. A battery source 35 is provided for a source of energization of the transistor drivers 22 and 23.

OPERATION FIG. 1

In operation, with the handle 2 of the control valve 3 in a well-known neutral or rubbing position there is no control pressure in the supply or control chambers 30 or lapping a feedback chamber 31 such that the diaphragms 28 and 29 are positioned as shown with the light guide 10 in its neutral position with the light beam from the fiber-optic tube 9 being directed away from the photodiodes 16 and 17. Movement of the handle 2 into an application zone causes a controlled supply of fluid under pressure from a source (not shown) to the chamber 30 to act on the diaphragm 28 and effect movement of the light guide 10 to the right in the guide bores 11 and 12 towards the lapping chamber 31 in opposition to the force of spring 34. As the light guide 10 moves to the right (as shown), the beam of light from the fiber-optic tube 9 contacts the photodiode 16 to cause operation thereof to complete circuitry including wires 18 and 19 and the transistor driver 22 to effect "turning on" of the said transistor driver 22 to result in energization of the release magnet valve 4. Energization of the release magnet 4 closes off the exhaust port 25 from the delivery pipes 24 and 24a. Continued movement of the light guide 10 to the right in response to continued supply of fluid under pressure to the supply chamber 30, causes the beam of light from the fiber-optic tube 9 to contact the photodiode 17 in addition to the photodiode 16. Thus, responsive to the operation of photodiode 17, additional circuitry is completed including the wires 20 and 21 and the transistor driver 23 to effect "turning on" of the said transistor driver 23 to result in energization of the application magnet valve 5. Energization of the application magnet 5 permits fluid under pressure from a source (not shown) to flow via supply pipe 26 to the pneumatic logic means 6 to perform the usual pneumatic functions such as effecting supply of fluid under pressure to the delivery pipes 24 and 24a and a feedback pipe 27. Supply of fluid under pressure to the delivery pipe 24a operates the usual pneumatic braking valves (not shown) to effect the desired braking in a well-known manner. Supply of fluid under pressure to the feedback pipe 27 is transmitted via choke 32 to a feedback or lapping chamber 31 to effect a lapping pressure therein in opposition to the pressure build up in the supply chamber 30 and cause the light guide 10 and the fiber-optic tube 9 to be moved back to the left. Movement of the fiber-optic tube back to the left causes the light beam therefrom to move out of contact with the photodiode 17 to thereby effect "turning off" of the transistor driver 23 and deenergization of the application magnet valve 5 with the release magnet valve still energized thereby creating a lapped condition of the braking apparatus. Any subsequent increase in the control pressure in chamber 30 effected by movement of the handle 2 further into an application zone will cause the light guide 10 and fiber-optic tube 9 to again be moved to the right such that the light beam therefrom again contacts the photodiode 17, "turns on" the transistor driver 23 and effects increased application of pneumatic brake action resultant from increased supply of fluid under pressure to the delivery line 24a. Similarly, any subsequent decrease in the control pressure in chamber 30 will result in the light guide 10 and fiberoptic tube 9 being moved to the left a sufficient distance that the light beam therefrom will be out of contact with both photodiodes 16 and 17. With both photodiodes out of contact with the light beam, both the transistor drivers 23 and 22 will be "turned off" to cause the respective application and release magnet valves 5 and 4 to shut off the supply of fluid under pressure and vent the delivery pipes 24, 24a, feedback pipe 27 and connected lapping chamber 31 to result in a brake release by connected brake control valves not shown. The venting of control chamber 30 is effected by any well-known valve means (not shown) on the control valve 3 when the handle 2 is moved toward a neutral or running position.

Summarizing; by controlling the supply of fluid under pressure to the control chamber 30 to regulate energization of the photodiodes, the following occurs:

With one photodiode 16 energized:
  a. release magnet energized—delivery pipe not vented.

With two photodiodes 16 and 17 energized:
  a. release magnet energized—delivery pipe not vented,
  b. application magnet energized—delivery pipe supplied with fluid under pressure With one photodiode 16 remaining energized after 17 is deenergized:
  a. release magnet energized—delivery pipe not vented,
  b. application magnet deenergized—supply of fluid under pressure to delivery pipe lapped.

With both photodiodes 16 and 17 deenergized:
  a. release magnet deenergized—delivery pipe vented,
  b. application magnet deenergized—supply of fluid under pressure to delivery pipe is stopped.

DESCRIPTION FIG. 2

Referring to FIG. 2 of the drawing, there is shown another embodiment of the control apparatus including a manually operated master controller or self-lapping valve 40 (shown within broken lines) controlled by positioning of hand-operated cam lever 41 pivotally mounted on a stationary pin 42. The cam surface of the cam lever 41 engages and rides on a movable guide member 43 which is slidably mounted to act against a spring 44 in a bore 45 of a spring casing 46 secured to a mounting bracket 47. A light source 48 energized by a battery source 49 supplies a light beam via a flexible fiber-optic tube 50 to a semiarcuate passage 51 in the light guide member 43. Also secured to the bracket 47 in a fixed position relative to said spring casing 46 is a diaphragm piston means 52 comprising a piston stem 53 secured to diaphragm 54 within the body 52a of the piston means 52 at one end of the piston stem 53. The diaphragm 54 and the body 52a of said piston means 52 define a spring chamber 55 on one side thereof and a feedback chamber 56 on the opposite side. A spring 57 encircling the piston stem 53 is positioned in the spring chamber 55 between the body of said piston means 52 and the diaphragm 54 in a manner to tend to maintain the piston stem 53 and diaphragm in a neutral position as shown. The opposite or outer end of the piston stem 53 passes through a guide bore 58 in the body of the piston means 52 and extends outwardly therefrom to where it is attached to a support bracket 59 located adjacent the guide member 43. A pair of photodiodes 60 and 61 are located in respective passages 62 and 63 in the support bracket 59 in a manner that the said diodes can be selectively positioned opposite the light beam at the passage 51 in the guide member 43 by relative movement of both the guide member 43 and the support bracket 59 as explained hereinafter.

Connected to the photodiodes 60 and 61 are flexible wires 64, 65, 66, and 67 leading to identical transistor configurations or drivers 68 and 69 comprised of elements and circuitry operative identically with those described in connection with FIG. 1. The transistor driver 68 includes a resistor 70 and two transistors 71 and 72 which when energized and "turned on" effect energization and operation of a release magnet valve 73 to result in closing off the venting port 74 of usual delivery pipes 75 and 75a in a pneumatic braking equipment. The transistor driver 69 includes a resistor 76, and two transistors 77 and 78 which when energized and "turned on" effect energization and operation of an application magnet valve 79 to permit fluid under pressure from a source (not shown) to flow via supply pipe 80 to the pneumatic logic means to effect supply of fluid under pressure to the delivery pipe 75 and 75a and a feedback pipe 81 to result in operation of the usual pneumatic braking equipment to effect a brake application in a well-known manner.

OPERATION FIG. 2

In operation, movement of cam lever 41 to the right from the neutral or running position as shown, into an application zone, causes the increasing diameter of the cam to engage the guide member 43 and move said guide member to the left against the forces of the spring 44. Movement of the guide member to the left causes the light beam from the flexible fiber-optic tube 50 to first contact the photodiode 61 and then contact both photodiodes 61 and 60. With just the one photodiode 61 exposed to the light beam, the photodiode 61 operates to complete the connected circuitry from a battery source 82 via wires 66 and 67 to "turn on" the transistor driver 68 and effect energization and operation of the release magnet valve 73 to stop venting of the delivery pipes 75 and 75a at the exhaust port 74. With both photodiodes 61 and 60 exposed to the light beam, the photodiode 61 operates as just described to energize the release magnet 73 while simultaneously, the photodiode 60 operates to complete circuitry from the battery source 82 via wires 64 and 65 to "turn on" the transistor driver 69 to effect energization and operation of the application magnet valve 79 to supply fluid under pressure from a source (not shown) via supply pipe 80 to the delivery pipes 75 and 75a to effect a brake application in a usual manner with braking equipment not shown. Fluid under pressure is also supplied via the feedback pipe 81 and a choke 83 to the feedback chamber 56 until the pressure therein acting on the diaphragm 54 against the spring 57 is sufficient to move the piston stem 53 to the left a distance sufficient to also move the connected support bracket 59 to the left a degree sufficient to position the photodiode 60 out of contact with the light beam and thereby effect deenergization of the application magnet valve 79 to result in a lap condition of the brake application in a usual manner. To effect a limited release of the brake application, the cam lever 41 is moved to left towards a neutral position shown, a limited degree sufficient to permit the forces of spring 44 to move the light beam in the guide member 43 to the right out of contact with either of the photodiodes 60 and 61 and thereby cause deenergization of the release magnet valve 73 and venting of the delivery pipes 75, 75a and feedback chamber 56 and pipe 81. Venting of the feedback chamber 56 permits the spring 57 to move the piston stem 53 and attached support bracket 59 to move the photodiodes 60 and 61 to the right until the light beam again contacts the photodiode 61 and initiates a lap condition in a manner heretofore described. To effect a complete brake release, the cam lever handle 41 must be moved to the left to its neutral or running position wherein the light beam in the guide member 43 is moved to its extreme right and cannot engage the photodiode 61 even when the feedback chamber 56 is completely vented and the support member 59 carrying the photodiodes has moved to its extreme right position. It can thus be seen that the movement of the cam lever 41 to the right, out of its neutral position, causes movement of the guide member 43 to the left, and the resultant movement of the support member 59 and photodiodes to the left in accordance with the degree of movement of the cam lever 41 relative to the degree of movement of the guide member 59 determines the degree of brake application.

Having now described the invention, what I claim as new and desire to secure by Letters Patent, is:

1. A control apparatus including a variably charged control chamber supplied with different degrees of fluid under pressure from a control valve to effect different control functions, wherein the improvement comprises:
a. a source of light,
b. a flexible fiber-optic tube means for conducting the beam of said source of light to desired locations,
c. a pair of light-responsive sensor means individually located to be in alignment with said fiber-optic tube means either singly or together to receive the light rays therefrom,
d. movable guide means for receiving said fiber-optic tube means and positioning same to be selectively in alignment with either one or both of said light-responsive sensor means responsively to the degree of fluid under pressure in the control chamber, and
e. circuit means selectively energized responsively to supply of light rays to said sensor means singly or together for producing selected control signals to effect desired control functions.

2. Control apparatus as claimed in claim 1 wherein said light-responsive sensor means are aligned in a valve body and wherein said guide means is slidably mounted within said valve body positionable therein responsive to the degree of fluid under pressure in the control chamber on one end of said valve body to selectively position the said fiber-optic tube to register with the said one or both sensor means.

3. Control apparatus as claimed in claim 2, further including a lapping chamber within said valve body at the opposite end thereof subject to be charged to various degrees of fluid under pressure to reposition said slidably mounted guide means to selectively position said fiber optic tube to register with only one or neither of said sensor means.

4. A control apparatus including a pneumatically operated master controller device having a fluid-pressure-responsive control chamber and a fluid-pressure-responsive lapping chamber variably charged for effecting different control functions, wherein the improvement comprises:
a. a source of light,
b. a flexible fiber-optic tube means for conducting the beam of said source of light to a desired location,
c. a first and second light-responsive sensor means individually located to be in alignment to receive the beam of said source of light sequentially at said first sensor means only, then said first and said second sensor means together and in reverse sequence as desired to effect a control function,
d. movable guide means for receiving said fiber-optic tube means and positioning same in a manner to position the light beam emitted therefrom to register selectively with said first or said first and second sensor means responsively to the degree of fluid pressure in the control chamber and in reverse sequence in response to the degree of fluid pressure in the lapping chamber as compared with the fluid pressure in the control chamber, and
e. circuit means selectively energized responsive to supply of said light beam to said first sensor means to effect a first control function and responsive to supply of said light beam to said first and said second sensor means to effect a second control function and responsive to supply of said light beam to said first and second sensor means in reverse sequence to effect a third control function.

5. A control apparatus including a manually operated cam lever movable to different positions to effect different control functions for a control means, wherein the improvement comprises:
a. a source of light,
b. a flexible fiber-optic tube means for conducting the beam of said source of light to desired locations,
c. a pair of light-responsive sensor means individually located to be in alignment with said beam of said source of light either singly or together to receive the light rays therefrom according to the positioning of said cam lever,
d. diaphragm piston means having a lapping chamber on one side thereof,
e. movable guide means for receiving said fiber-optic tube means and positioning same to be selectively in alignment with either one of both of said light-responsive sensor means in accordance with the supply of fluid under pressure to said lapping chamber, and
f. circuit means selectively energized responsively to supply of light rays to said sensor means singly or in pairs for producing selected control signals to effect desired control functions to supply fluid under pressure to said lapping chamber and the control means.

* * * * *